United States Patent [19]

Marren

[11] Patent Number: 5,232,135
[45] Date of Patent: Aug. 3, 1993

[54] TRUNK TOP CARRIER

[75] Inventor: Joyce C. Marren, 1615 Opossum Cir., El Paso, Tex. 79927

[73] Assignee: Joyce C. Marren, El Paso, Tex.

[21] Appl. No.: 816,975

[22] Filed: Jan. 6, 1992

[51] Int. Cl.$^5$ .............................................. B60R 9/00
[52] U.S. Cl. ................... 224/42.43; 224/42.08; 224/317
[58] Field of Search ........ 224/282, 309, 317, 42.03 R, 224/42.43, 42.44, 310, 42.07, 42.08, 328; 296/37.1, 37.7; 280/727, 762, 769

[56] References Cited

U.S. PATENT DOCUMENTS

| | | | |
|---|---|---|---|
| 2,779,524 | 1/1957 | Carlson | 224/42.08 |
| 2,802,612 | 8/1957 | Barcafer | 224/42.08 |
| 2,941,706 | 6/1960 | Slater | 224/42.08 |
| 3,103,289 | 9/1963 | Clary | 224/42.08 X |
| 3,507,414 | 4/1970 | Souza | 224/310 X |
| 3,757,975 | 9/1973 | Sneider | 224/42.08 X |
| 4,061,257 | 12/1977 | St. Clair | 224/42.08 |
| 4,089,448 | 5/1978 | Traeger | 224/42.03 R X |
| 4,682,719 | 7/1987 | Ernst et al. | 224/310 |
| 4,700,873 | 10/1987 | Young | 224/42.07 |
| 4,744,590 | 5/1988 | Chesney | 280/769 |
| 4,915,276 | 4/1990 | Devito | 224/42.43 |
| 5,029,740 | 7/1991 | Cox | 224/42.44 X |
| 5,038,983 | 8/1991 | Tomososki | 224/42.43 |
| 5,094,373 | 3/1992 | Lovci | 224/382 X |
| 5,106,002 | 4/1992 | Smith et al. | 224/42.03 R X |

*Primary Examiner*—Henry J. Recla
*Assistant Examiner*—Glenn T. Barrett

[57] ABSTRACT

A cargo carrier platform for use on the outside of a motor vehicle having a frame mounted trailer hitch receiver includes a rigid platform for mounting the cargo carrier, and a separate bracket for attaching the rigid platform to the frame mounted trailer hitch receiver. The bracket is adapted at the lower end for insertion into the receiver for supporting the cargo carrier platform without attachment to the bumper, frame, or any other surface of the vehicle. At the upper end, a rigid, flat platform is attached to the bracket by way of a swivel mount to support and stabilize the cargo carrier. The bracket and attached platform are shaped to position the cargo carrier over the vehicle's trunk. The attached cargo carrier platform rotates in its mounting bracket to permit access to the vehicle's trunk without the necessity of the removal of the cargo carrier or its contents.

4 Claims, 5 Drawing Sheets

TRUNK TOP CARRIER

BACKGROUND OF THE INVENTION

Many goods have been produced in countries like the United States. Now countries like China and Mexico are producing many goods. Modern man acquires many material items essential to his daily life. When he goes on a trip or travels, he likes to take many items with him; even if those items are just, in fact, for pleasure or sports. And he likes to travel. Unfortunately, for consideration of fuel efficiency and alternative fuel storage, automobiles and automobile storage space is being reduced.

To increase storage space, many travelers use roof mounted cargo carriers on their automobiles. These carriers are burdensome to install as they typically are fastened to the vehicle in four places. They are hard to reach from the ground and therefore difficult to load and unload. These roof mounted carriers also have a high potential to mar the automobile roof. Moreover, these cargo carriers greatly increase the drug coefficient of the vehicle. Fuel consumption and the resultant load on the automobilie's drivetrain components are also increased. A cargo carrier could be secured to the trunk of the vehicle in an attempt to decrease the drag coefficient, thereby increasing fuel efficiency and decreasing drivetrain load, but then it would be very difficult to open or enter the trunk.

Other load-carrying devices are known which attach to the rear bumper of the vehicle. However, it has been found that automobile bumpers typically are structurally inadequate to support substantial loads. Moreover, modern aerodynamic design has changed the character of the automobile bumper so that they rae now integrated into the exterior shape of the vehicle. Generally, little or no access is provided to get around the edges to the inside of the bumper. Thus, cargo carriers that require clamping around the rear bumper cannot be used on many modern vehicles. Examples of devices of this type are shown in U.S. Pat. Nos. 2,779,524; 2,941,706; 3,103,289; 3,507,414; 3,757,975; 4,061,257; and; 4,089,448.

Another load-carrying device for use with automobiles is known which is adapted for bolting onto the vehicle's frame is shown in U.S. Pat. No. 4,700,873.This devices is very difficult to install and remove because of the need to crawl under the vehicle to clamp the devices onto the frame. Also, this device provides no way to access to the vehicle's cargo compartment without first necessitating the removal of the device and its load.

Another load-carrying device for use with automobiles is known which is adapted for use with a frame mounted bracket is shown in U.S. Pat. No. 2,802,612. This device, while providing for access to the vehicle's cargo compartment without removal of the device, requires the removal of the load from the device to access the vehicle's cargo compartment.

Another load-carrying device for use with automobiles is known which is mounted to the rear bumper and frame shown in U.S. Pat. No. 3,202,332. While this device also permits access to the vehicle's cargo compartment, it requires permanent mounting bolts to the rear bumper and to the frame of the vehicle.

Other load-carrying devices are known for use with a frame mounted receiver hitch and are shown in U.S. Pat. Nos. 4,915,276; 5,029,740; 5,038,983, and; 5,106,002. However, with the exception of U.S. Pat. No. 5,038,983, these devices are designed to be mounted to the rear of and behind the vehicle and are primarily for use on "Sport/Utility" type vehicles. The device shown in U.S. Pat. No. 5,038,983 is also intended for use on an automobile. However, the design of this device, when mounted on an automobile, places the load behind the rear bumper, well behind the center of the rear wheels, which acts to exaggerate the load on the vehicle's rear springs. While a "Sport/Utility" vehicle is designed and equipped to support heavier loads placed on the rear of the vehicle, the average automobile is not so designed and equipped.

Another load-carrying device is known for use with a frame mounted receiver hitch is shown in U.S. Pat. No. 5,094,373. However, this device is designed for the carrying of a bicycle or other similar load and not designed or intended to support a cargo carrier.

Accordingly, the need remains for a cargo carrier attachment for use on an automobile which can be quickly and easily attached to and detached from the vehicle, preferably without the need for tools. The invention presented herein is a unique solution to this problem. The device described herein allows the cargo carrier to be securely suspended over the top of the trunk. When desired, the cargo carrier can be easily removed from its position over the trunk, without unloading, and the trunk can then be easily opened and entered.

SUMMARY OF THE INVENTION

One object of the invention is to improve upon auxiliary cargo accessories for automobiles. Another object is to provide a cargo carrier that does not require attachment to the bumper or the frame of the underside of an automobile, yet can carry substantial loads safely. Yet another object is the provision of an auxiliary cargo carrier which is constructed from a minimum number of parts, assembled with ease, and thus provides a cargo carrier which is admirably adapted for its intended use, is inexpensive to manufacture, and is easily installed and removed from the vehicle. A further object is to enable a single configuration of cargo carrier to be used with a variety of vehicle body and bumper designs. Yet another object is to provide for conveniently carrying cargo at the rear of the vehicle, over the vehicle's cargo area (trunk) which provides for far better load balance with the vehicle, while retaining easy accessibility to the trunk. Finally, the object is to provide for the mounting of an accessory trailer hitch which can be used in conjunction with the cargo carrier.

The present invention mounts a currently manufactured and readily available "car top" cargo carrier over an automobilie's trunk, and provides the ability to quickly and easily moving the cargo carrier from its position over the trunk. The invention is a holder and receptacle for the holder. The holder fits into one end of the receptacle. The other end of the receptacle fits in and attaches to an automobile frame mounted hitch receiver. The holder consists of horizontal bars to support the cargo carrier, a way to secure the cargo carrier to the holder and a support bar which is at an angle of 100 degrees to the horizontal bars. The support bar fits into the receptacle, and can be turned inside the receptacle. A pin or other device can be used to keep the holder from turning when the holder and cargo carrier are to be held in their stationary position over the trunk. The end of the receptacle that fits into the frame mounted receiver is perpendicular to the end that houses the holder's support bar.

BRIEF DESCRIPTION OF THE DRAWING

The invention can be better understood by examining the following in connection with the accompanying drawings, to wit.

DESCRIPTION OF THE PREFERRED EMBODIMENTS

Figure 1:
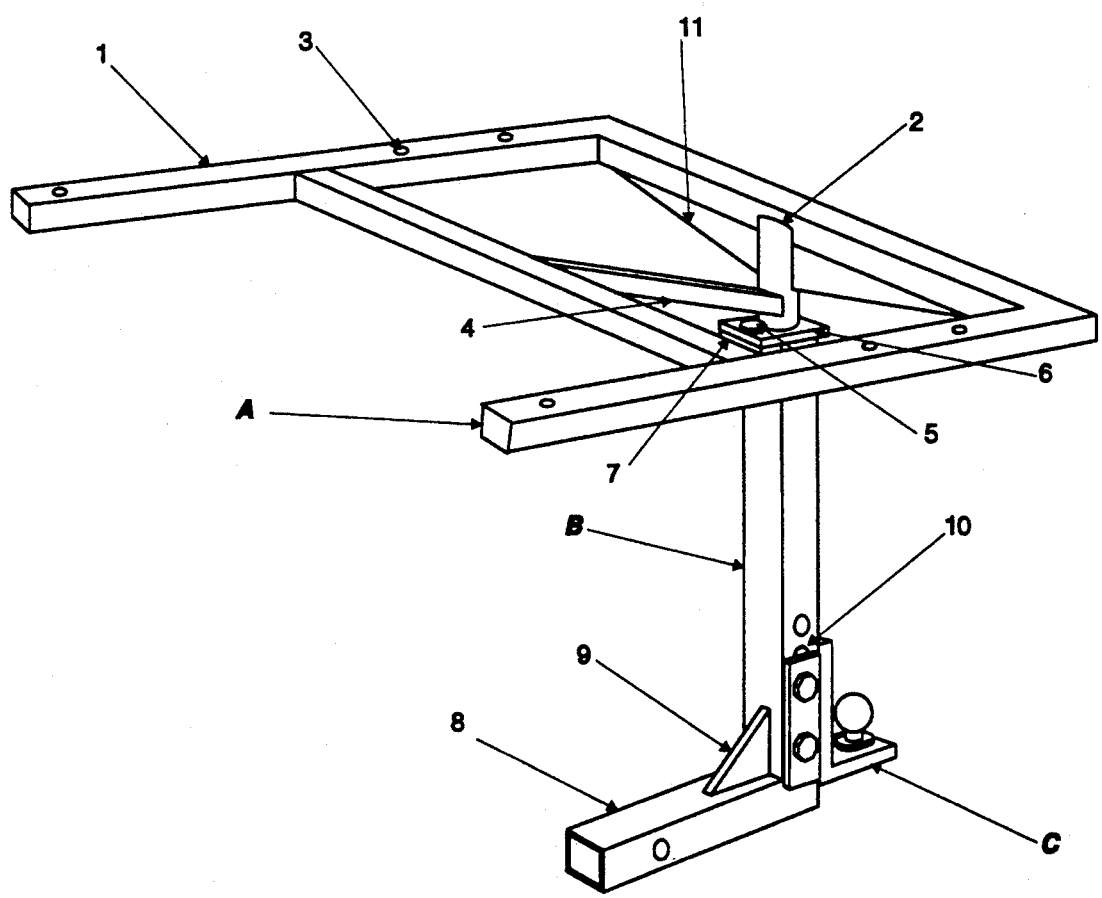
FIG. 1 is a perspective view of the device, with the optional towing attachment, looking down at one of its sides.
Figure 2:
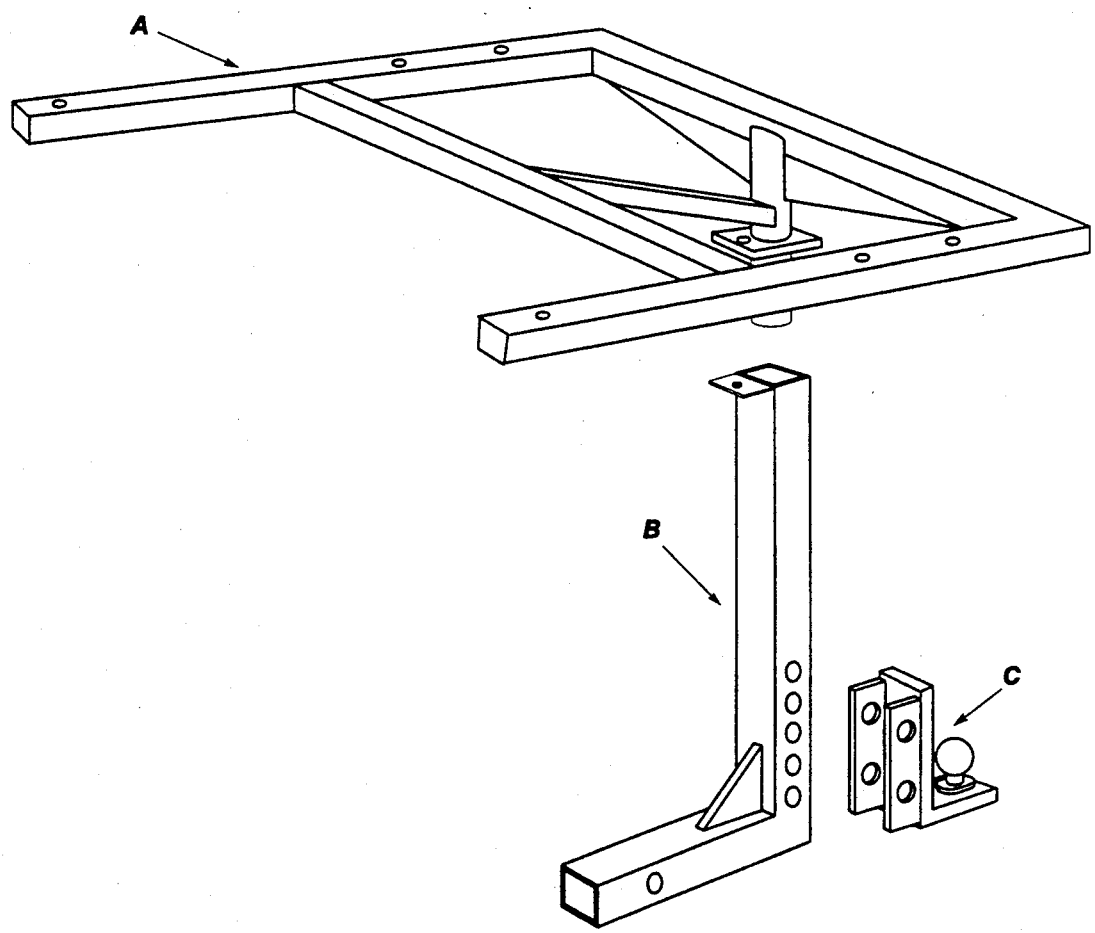
FIG. 2 is an exploded view of the complete device.
Figure 3:
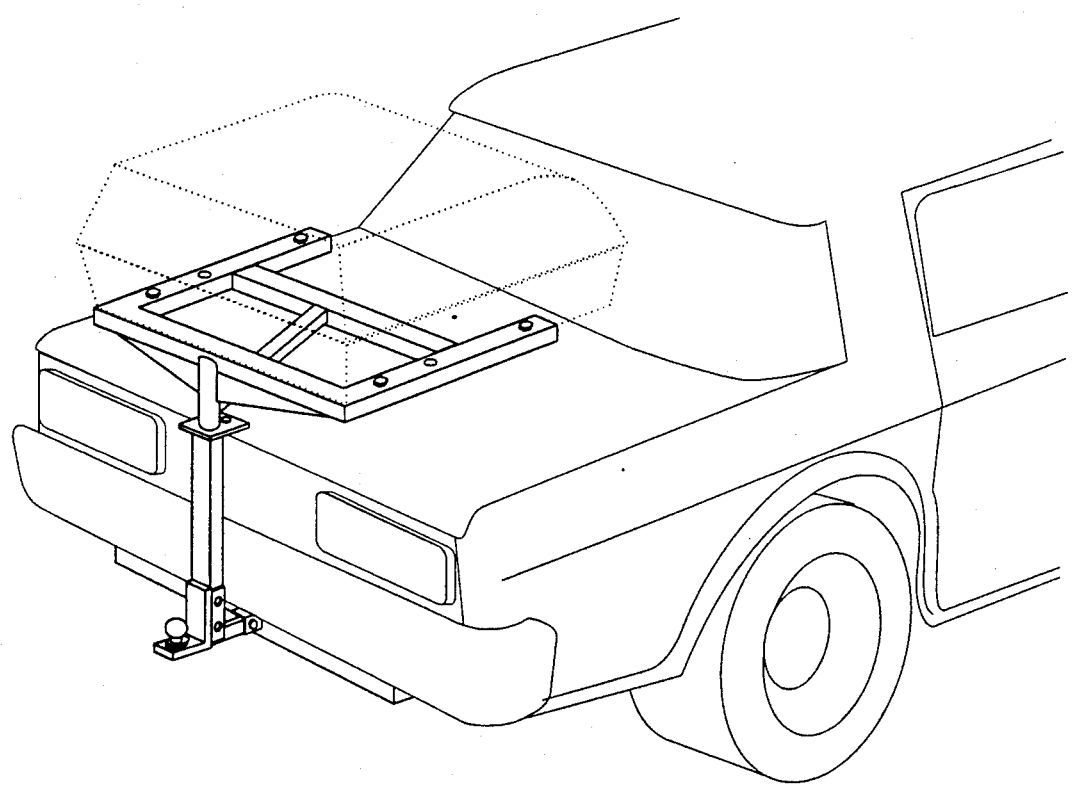
FIG. 3 is a perspective view of the device with a cargo carrier attached (shadow) and mounted on a vehicle in the forward mounting position.
Figure 4:
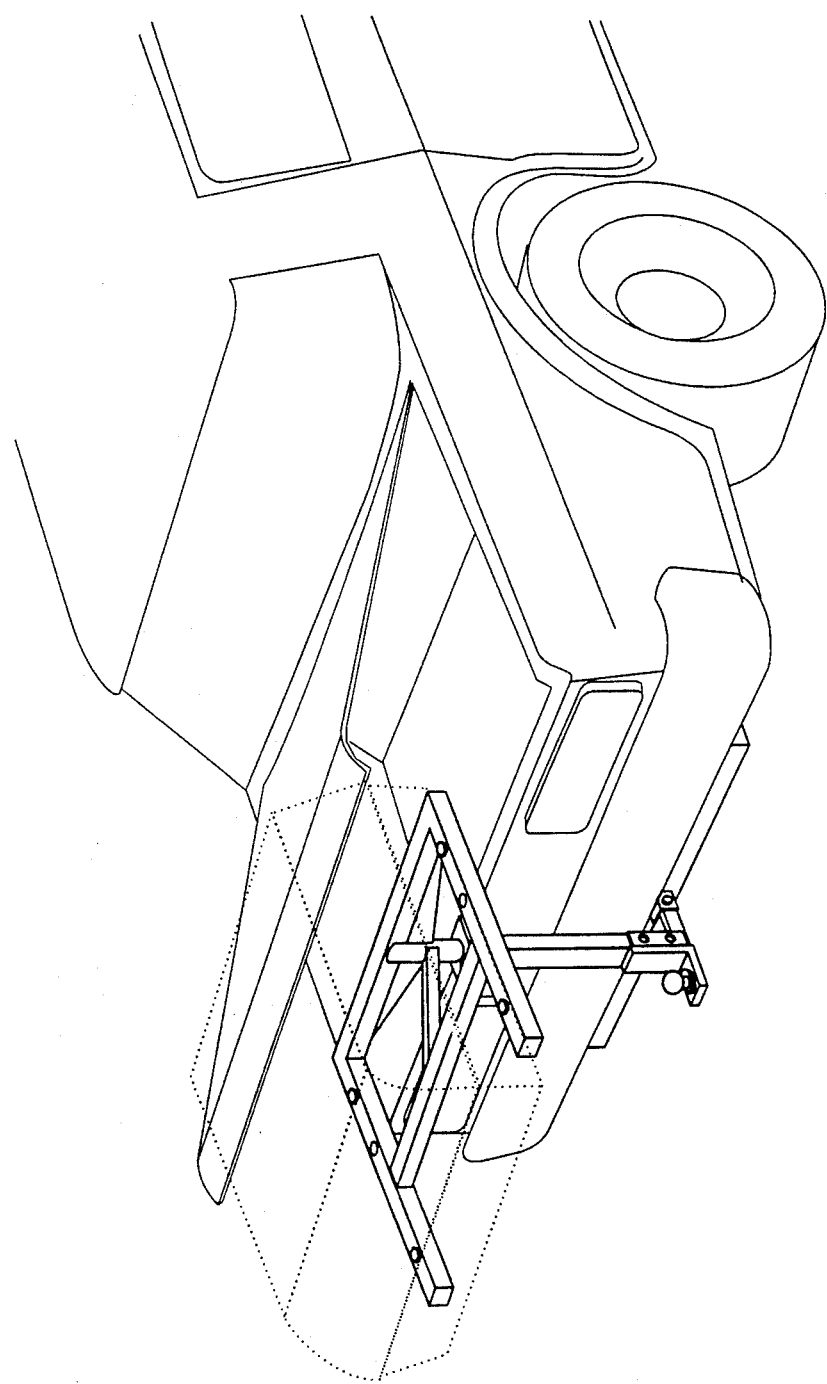
FIG. 4 is a perspective view of the device, with a cargo carrier (shadow) attached, mounted on a vehicle and rotated to the rear of the vehicle to demonstrate the accessibility to the vehicle's trunk.
Figure 5:
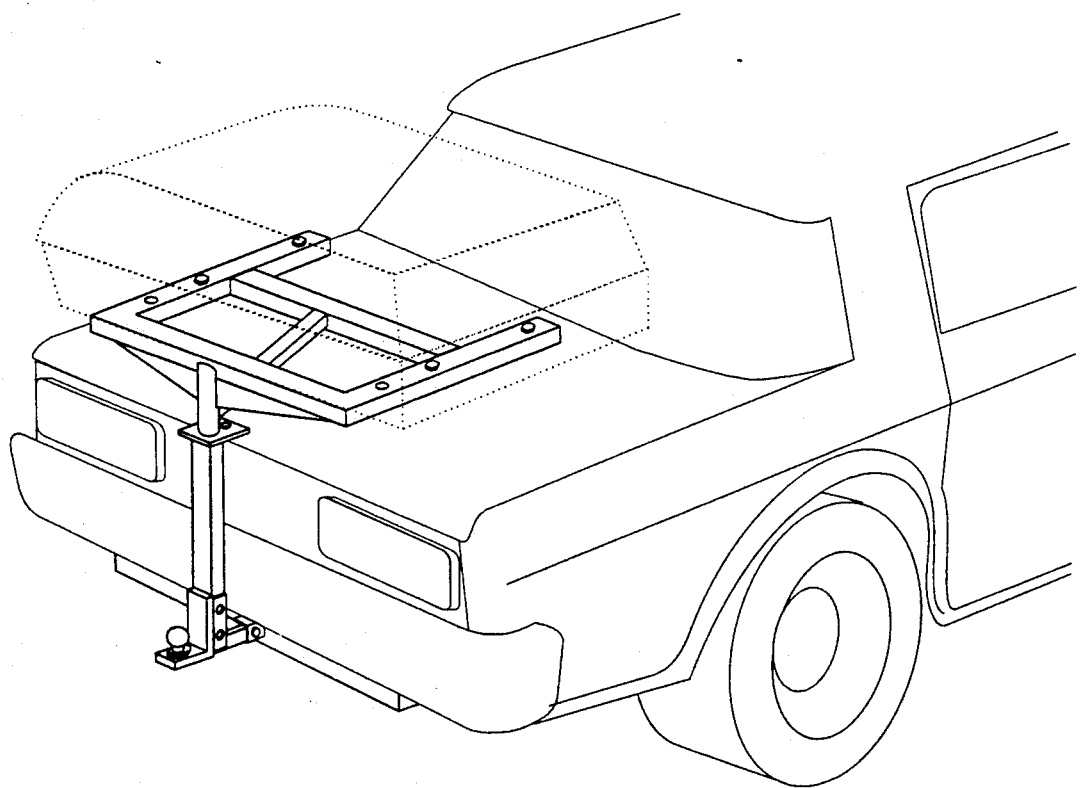
FIG. 5 is a perspective view of the device with a cargo carrier (shadow) attached and mounted on a vehicle in the sideways mounting position.

Referring now to the drawings, the preferred embodiments of the invention consist of the following: a holder (A) for a cargo carrier and a receptacle (B) for the holder as shown in FIG. 1. The holder (A) consists of horizontal bars (1) on which the cargo carriers sits and a support bar (2), which is at an elevated angle of 10 degrees in the perpendicular plane to the horizontal bars and fits into one end of the receptacle. Holes (3) are placed in the horizontal bars for attaching the cargo carrier in one of either two available positions. The cargo carrier can be mounted to either open towards the rear of the vehicle or to the side of the vehicle depending on the owner's preference or design or the cargo carrier. A bracing bar (4) runs from the center horizontal bar to the support bar to guarantee the 100 degree angle. The holder support bar (2) can be rotated in the receptacle. To hold support bar (2) and holder with cargo carrier in its position and to prevent the holder and cargo carrier from being separated from the receptacle, a securing device (5) (lock or bolt) is placed through holes in plates (6) and (7) located at the ends of the support bar and the receptacle where they meet. One end of the receptacle (8) fits into a standard automobile frame mounted hitch receiver. Gussets (9) and (11) are used for reinforcement. Holes (10) are placed in the lower end of the receptacle for mounting a hitch ball mount (C) which is adjustable for height.

What is claimed is:

1. A cargo trailer platform for use on a motor vehicle haing a trunk and a trailer hitch receiver, said carrier platform being adapted for supporting a cargo carrier container over said vehicle trunk, said cargo carrier platform comprising:

a holder adapted to support a cargo carrier container mounted thereon, said holder having a plurality of interconnected horizontal bars, a support bar which depends from one of said plurality of horizontal bars, said support bar extending from said one of said plurality of horizontal bars at an angle of approximately 100 degrees with respect to a plane containing said plurality of bars, and a bracing bar which extends from the support bar to another one of said plurality of bars to maintain the angle between the support bar and the horizontal bars;

an L-shaped receptacle having one end adapted to be received in said trailer hitch receiver and a second end adapted to rotatably receive said support bar of said holder such that said holder can be rotated about a vertical axis from a position overlaying the vehicle trunk to a position in which the holder is positioned adjacent the trunk such that the vehicle trunk can be accessed; and means for selectively preventing the rotation of the holder with respect to the receptacle when the holder is said position overlying said vehicle.

2. A cargo carrier platform according to claim 1, wherein said means for selectively preventing the rotation of the holder includes a plate secured to said support bar and a plate mounted to the second end of the receptacle wherein said plates include mating apertures adapted to receive a securing device therein.

3. A cargo carrier platform according to claim 1, wherein said platform further includes a hitch ball mounted secured to said receptacle.

4. A cargo carrier platform according to claim 3, wherein said hitch ball mount is adjustably secured to said receptacle.

* * * * *